United States Patent [19]

Leigh-Monstevens

[11] Patent Number: 5,083,433
[45] Date of Patent: Jan. 28, 1992

[54] PREFILLED HYDRAULIC ACTUATOR APPARATUS WITH SEPARATE RESERVOIR AND QUICK-CONNECT BETWEEN THEM

[75] Inventor: Keith V. Leigh-Monstevens, Troy, Mich.

[73] Assignee: Automotive Products plc, Warwickshire, England

[21] Appl. No.: 492,430

[22] Filed: Mar. 6, 1990

Related U.S. Application Data

[63] Continuation of Ser. No. 58,189, Jun. 4, 1987, abandoned.

[51] Int. Cl.⁵ .......................... B60T 11/26; F15B 7/08
[52] U.S. Cl. ......................................... 60/585; 60/588; 285/921; 141/98
[58] Field of Search .................... 285/3, 4, 256, 319, 285/921; 60/584–585, 588; 141/98 R; 188/352; 92/142

[56] References Cited

U.S. PATENT DOCUMENTS

| 3,765,728 | 10/1973 | Peruglia | 303/10 X |
| 3,920,786 | 11/1975 | Brunelle et al. | 264/251 |
| 4,022,496 | 5/1977 | Crissy et al. | 285/3 |
| 4,407,125 | 10/1983 | Parsons | 60/584 |
| 4,506,507 | 3/1985 | Wimbush | 60/585 X |
| 4,566,276 | 1/1986 | Komorizono et al. | 60/585 |
| 4,590,765 | 5/1986 | Leigh-Monstevens | 60/585 |
| 4,607,670 | 8/1986 | Compton et al. | 60/584 X |
| 4,620,625 | 11/1986 | Ladin | 192/85 CA |
| 4,673,199 | 6/1987 | Renfrew | 285/319 X |
| 4,730,856 | 3/1988 | Washizu | 285/319 |
| 4,749,214 | 6/1988 | Hoskins et al. | 285/4 |
| 4,959,960 | 10/1990 | La Fountain | 60/585 X |

FOREIGN PATENT DOCUMENTS

| 0146283 | 11/1984 | European Pat. Off. | |
| 1929522 | 12/1970 | Fed. Rep. of Germany | 285/3 |
| 2453237 | 5/1976 | Fed. Rep. of Germany | 285/3 |
| 3631812 | 3/1987 | Fed. Rep. of Germany | 285/4 |
| 998697 | 1/1952 | France | 60/585 |
| 1219362 | 5/1960 | France | 60/585 |
| 1245797 | 10/1960 | France | |
| 384724 | 12/1932 | United Kingdom | 60/588 |
| 680283 | 10/1952 | United Kingdom | 60/585 |
| 1098837 | 5/1964 | United Kingdom | |
| 1132443 | 11/1965 | United Kingdom | |
| 1118234 | 3/1966 | United Kingdom | |

OTHER PUBLICATIONS

Lockheed Parts Catalog, "Master Cylinder Integral Barrel Type", p. 21, vol. 2.
1 page from the Volkswagen Workshop Manual for the Volkswagen Quantum.

Primary Examiner—Edward K. Look
Assistant Examiner—John Ryznic
Attorney, Agent, or Firm—Krass and Yound

[57] ABSTRACT

A preassembled, prefilled hydraulic actuator apparatus for a motor vehicle clutch and adapted for connection to a non-integral fluid reservoir. The apparatus comprises a master cylinder having a supply inlet and a working pressure outlet, a slave cylinder having an inlet, a working pressure conduit interconnecting the outlet of the master cylinder and the inlet of the slave cylinder, and a low-pressure supply conduit for connection to a reservoir. In one embodiment, the supply conduit is connected at one end to the master cylinder inlet and the free end of the supply conduit is sealed by a bung partition, a piercing coupling is provided on the free end of the supply conduit, and the coupling is connected to an outlet fitting on a prefilled reservoir which may also serve as the hydraulic fluid source for the brake system of the vehicle. The coupling functions in the course of the connecting operation to pierce the bung partition sealing the free end of the supply conduit and to further pierce a bung partition in the outlet of the reservoir so that fluid communication is thereby established between the hydraulic actuating apparatus and the reservoir. Another embodiment is disclosed in which the supply conduit is connected at one end to the reservoir outlet with its other end sealed; another embodiment is disclosed in which two supply conduits are respectively connected to the reservoir outlet and the master cylinder inlet; and another embodiment is disclosed in which a quick-connect coupling replaces the piercing coupling.

5 Claims, 5 Drawing Sheets

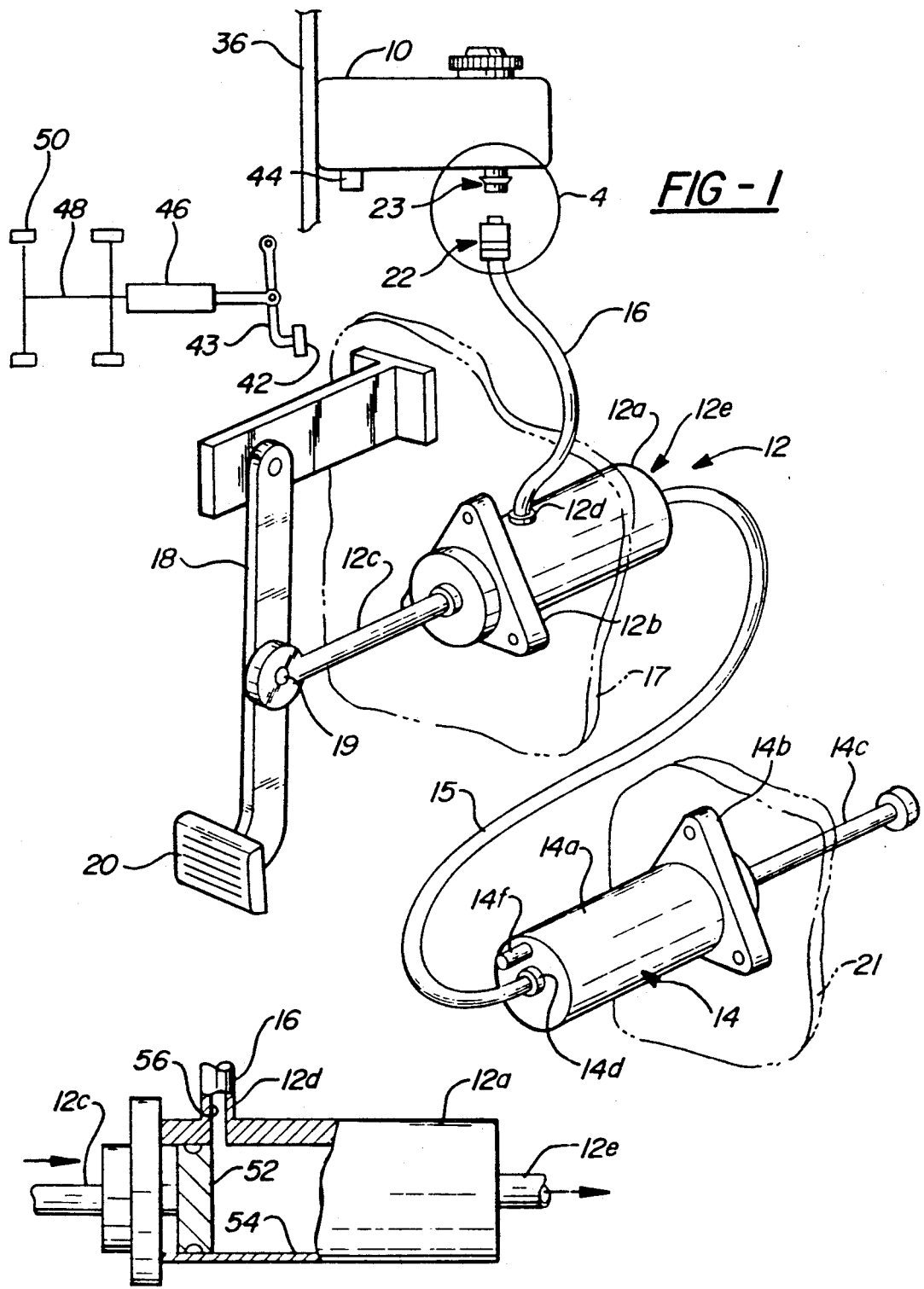

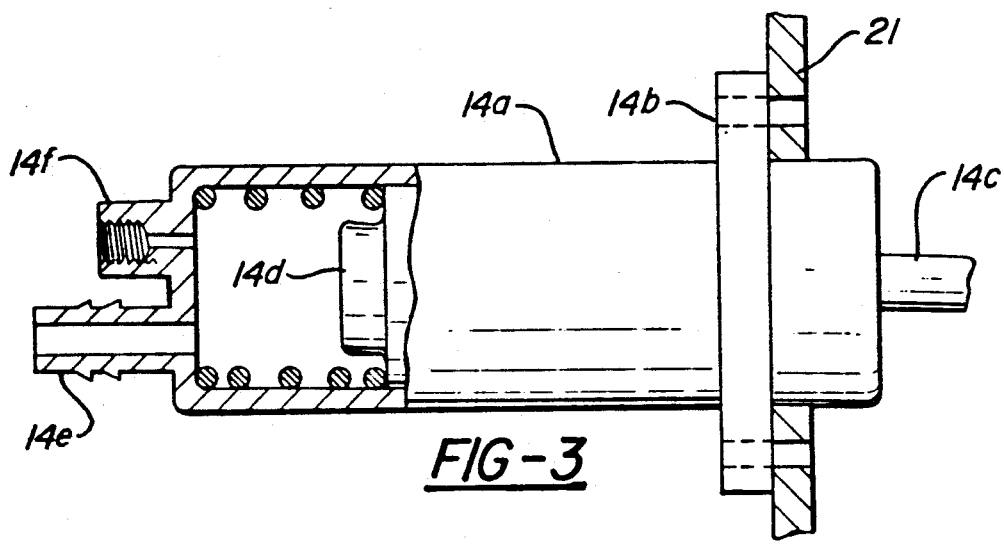
FIG-3
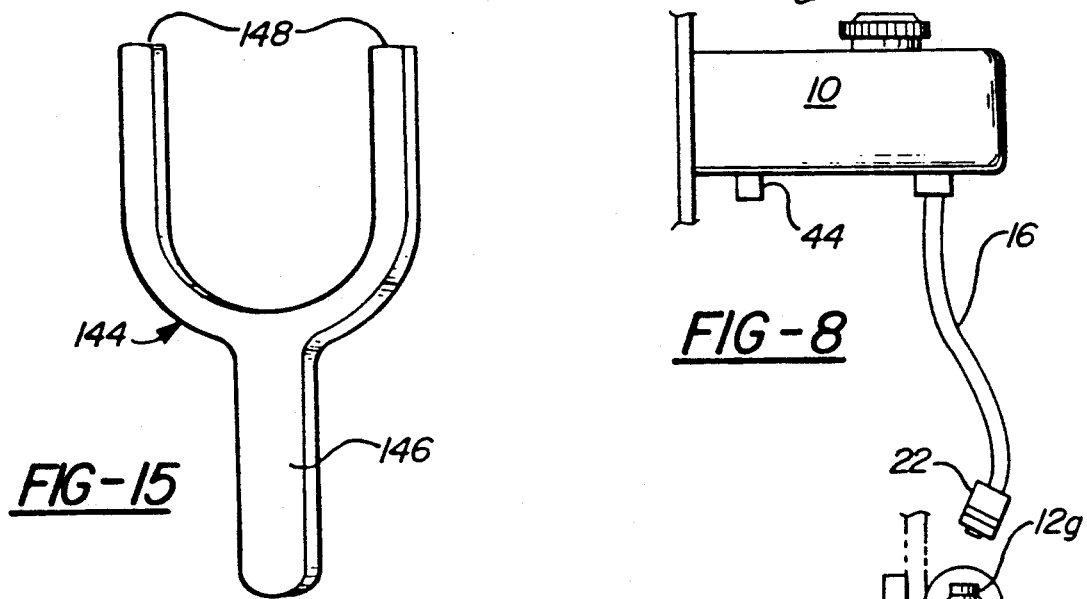
FIG-15
FIG-8
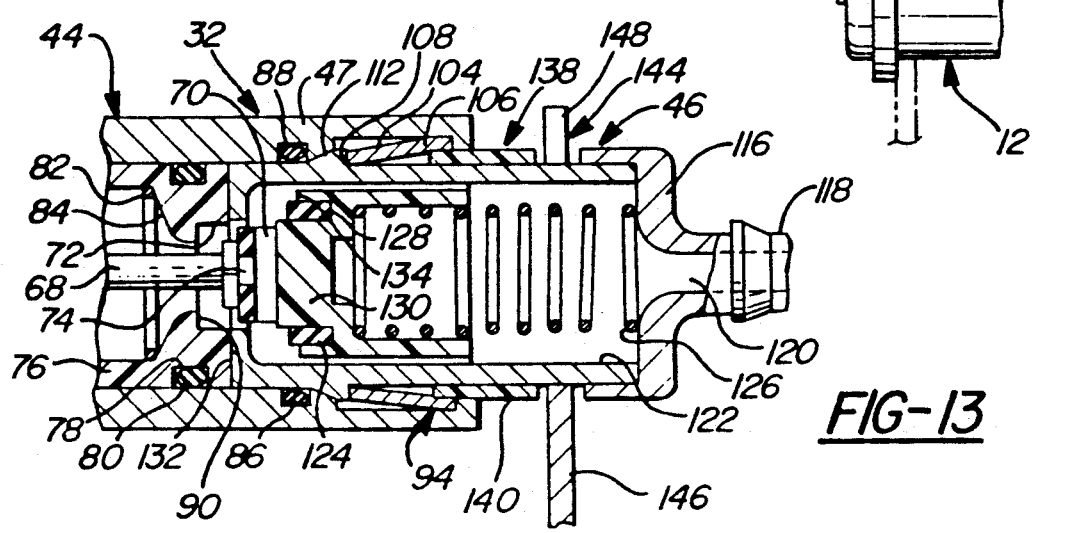
FIG-13

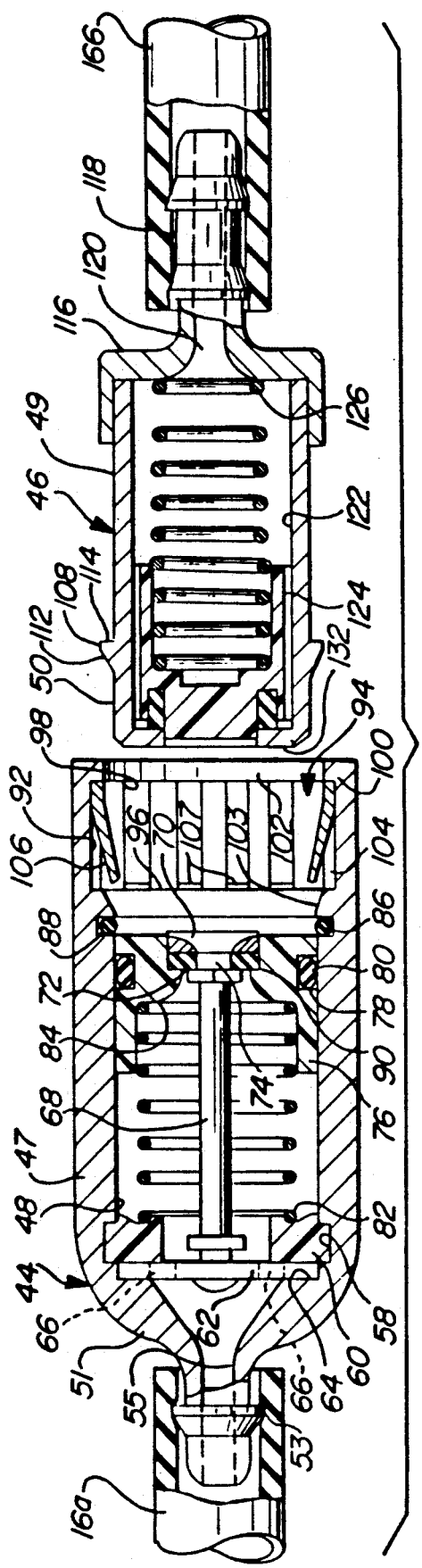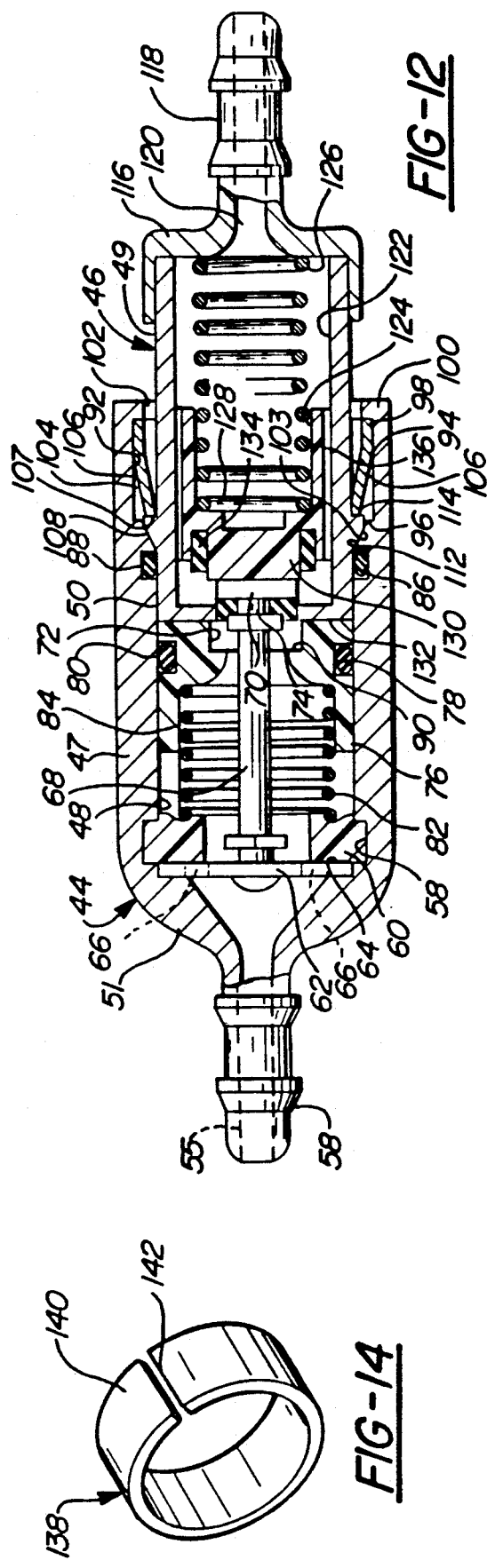

PREFILLED HYDRAULIC ACTUATOR APPARATUS WITH SEPARATE RESERVOIR AND QUICK-CONNECT BETWEEN THEM

This is a continuation of co-pending application Ser. No. 058,189 filed on June 4, 1987 now abandoned.

FIELD OF THE INVENTION

This invention relates to hydraulic actuator systems for motor vehicle clutches and more particularly to a preassembled and prefilled hydraulic clutch actuator system which can be connected to a detached fluid reservoir.

BACKGROUND OF THE INVENTION

Hydraulic actuators are known for operating motor vehicle clutches and other mechanism at a remote location by way of a master cylinder and slave cylinder combination. The master cylinder is operated, for example, by the clutch pedal, and the slave cylinder is connected to the clutch via a throwout bearing. The master and slave cylinders are interconnected by a high-pressure line or conduit. Depressing the clutch pedal displaces the piston in the master cylinder to close a passage or port between the master cylinder fluid chamber and a fluid reservoir, and to pressurize the connection to the slave cylinder. Displacement of the piston in the slave cylinder disengages the clutch.

It is also known to preassemble and prefill apparatus of this type before shipment of the assembly to a motor vehicle manufacturer for installation on the motor vehicle. The motor vehicle manufacturer need only fix the master and slave cylinders in place and make simple mechanical connections to the clutch pedal and clutch bearing. See U.S. Pat. No. 4,599,860 "Liquid Pressure Apparatus" issued July 15, 1986 to David Parsons and assigned to Automotive Products, plc of Warwickshire, England.

The hydraulic system shown in the aforementioned Parsons patent discloses a fluid reservoir which is integral with the master cylinder and which is dedicated exclusively to the clutch actuator. Prefilled and preassembled hydraulic actuator apparatus of this type have achieved wide acceptance, particularly in the automotive industry, because of the ease of installation in the motor vehicle, because of their extremely reliable operation over long periods of time and because of their ability to automatically compensate for wear.

There are situations in which it is desirable to employ such prefilled hydraulic actuator apparatus in a system utilizing a detached reservoir; such a reservoir may, for example, supply fluid both to the preassembled and prefilled hydraulic clutch actuator and to another system on the vehicle such as the brake system.

SUMMARY OF THE INVENTION

This invention is directed to the provision of a preassembled and prefilled motor vehicle clutch hydraulic actuator assembly suitable for use with a detached reservoir; i.e., a reservoir which is not shipped or installed as an integral unit of the clutch actuator assembly.

In general, the invention comprises the preassembled and prefilled combination of a master cylinder and slave cylinder interconnected by means of a high-pressure working fluid line. In addition, the combination comprises prefilled low pressure supply conduit means connected between the supply inlet of the master cylinder and the outlet of a remote reservoir. Through this arrangement, the prefilled supply conduit means can be connected between the remote reservoir and the master cylinder without concern for the admission of a small amount of air to the supply, since it is already at atmospheric pressure. This invention provides the advantage of the prefilled system of U.S. Pat. No. 4,599,860 but has the further advantage of being compatible with multiple-use, non-integral fluid reservoirs.

More specifically, the present invention provides hydraulic actuating apparatus of the type including a master cylinder having an inlet and an outlet; a slave cylinder having an inlet; a high pressure working fluid conduit interconnecting the outlet of the master cylinder and the inlet of the slave cylinder; and hydraulic fluid filling the slave cylinder, the conduit, and the master cylinder. In one embodiment of the invention, another low pressure supply conduit is sealingly connected to the inlet of the master cylinder and coupling means are provided on the free end of the supply conduit. The coupling means has a condition in which it is operative to provide a seal at the free end of the conduit, to thereby seal the hydraulic fluid in the preassembled hydraulic actuating apparatus, and is operative in response to connection of the free end of the supply conduit to an outlet fitting on a reservoir to open the seal in the free end of the conduit so as to allow fluid communication between the conduit and the reservoir.

This arrangement allows the preassembled hydraulic actuating apparatus to be utilized with a common reservoir such, for example, as a reservoir also serving the motor vehicle brake system and, specifically, allows the motor vehicle brake system to be installed in the vehicular assembly process, the brake system bled and filled including filling the reservoir, and the prefilled hydraulic actuating apparatus thereafter installed in the vehicle with the coupling means on the free end of the supply conduit extending from the master cylinder operating upon connection of the free end to the reservoir to open the seal in the free end of the conduit to provide fluid communication between the prefilled reservoir and the prefilled hydraulic actuating apparatus.

In another embodiment of the invention, the low pressure supply conduit is sealingly connected to an outlet of the reservoir and coupling means are provided on the free end of the conduit. The coupling means has a condition in which it is operative to provide a seal at the free end of the supply conduit and is operative in response to connection of the free end of the supply conduit to an inlet fitting on the master cylinder to allow fluid communication between the conduit and the master cylinder.

In another embodiment of the invention, a first supply conduit is sealingly connected to the inlet of the master cylinder, a second supply conduit is sealingly connected to an outlet of the reservoir, and coupling means are provided on the free ends of the supply conduits. The coupling means are normally operative to seal the respective free ends of the supply conduits but operate in response to coupling of the free ends together to establish fluid communication between the supply conduits.

In any of the invention embodiments, the coupling means may comprise a fracture type coupling or a quick connect type coupling.

The fracture type coupling is operative to break a seal in response to connection of the free end of the supply conduit to a reservoir outlet fitting, to a master cylinder inlet fitting, or to the free end of another supply conduit. This arrangement allows, for example, the reservoir to be constructed with a frangible bung partition which seals the reservoir prior to installation of the preassembled and prefilled hydraulic actuating apparatus and which is broken in response to connection of the conduit of the prefilled apparatus to the reservoir outlet fitting to provide fluid communication between the prefilled reservoir and the prefilled hydraulic actuating apparatus.

According to a feature of the fracture type coupling, the coupling means on the free end of the supply conduit includes a bung plug in the free end of the conduit defining a bung partition sealing the free end of the conduit; a locking member secured at its rearward end to the free end of the conduit in surrounding relation to the bung plug and including latch means at its free, forward end for latching coaction with latch means on the reservoir outlet fitting, and a piercing member disposed concentrically within the locking member forwardly of the bung partition and movable relative to the locking member in response to connection of the locking member to the reservoir outlet fitting to pierce the bung partition. This coupling means construction provides an inexpensive and effective device for quickly and effectively piercing the bung partition in the free end of the conduit in response to coupling of the conduit to the reservoir or the master cylinder.

According to a further feature of the fracture type coupling, the bung plug is cup-shaped and includes an annular rim portion seating on the free annular end of the conduit, a cylindrical main body portion extending rearwardly from the rim portion and positioned concentrically within the free end of the conduit, and a bottom portion closing the rear end of the main body cylindrical portion and defining the bung partition; and the piercing member includes a central main body piercing portion positioned in preassembled condition concentrically within the cylindrical main body portion of the bung plug with its rear end positioned forwardly of the bung partition and movable rearwardly in response to connection of the locking member to the reservoir outlet fitting or the master cylinder inlet fitting to pierce the bung partition, and an annular external flange portion slidably disposed within the locking member and movable into seating engagement at its rear face with the rim portion of the bung plug in response to connection of the locking member to the reservoir outlet fitting or the master cylinder inlet fitting to define the post assembly position of the piercing member. This specific construction provides an inexpensive and efficient means of effectively sealing the conduit in the preassembled condition and readily piercing the bung partition in the conduit upon connection of the conduit, for example, to the reservoir of the master cylinder.

According to a further feature of the fracture type coupling, the reservoir or master cylinder includes a hollow cylindrical portion projecting outwardly from the main body of the reservoir or of the master cylinder and sized to fit telescopically within the forward end of the locking member; a bung partition is provided in the hollow cylindrical portion for closing the hollow cylindrical portion; the latching means comprises latch means on the external surface of the hollow cylindrical portion; the main body piercing portion of the piercing member extends forwardly and rearwardly from the piercing member flange portion; and the forward end of the piercing member main body portion moves into the hollow cylindrical portion and pierces the bung partition in response to connecting movement of the forward end of the locking member telescopically over the hollow cylindrical portion and latching engagement of the locking member latch means with the latch means on the external surface of the hollow cylindrical portion. This arrangement provides an inexpensive and effective means of quickly and effectively piercing the bung partition in the free end of the conduit while simultaneously piercing the bung partition in the reservoir or in the master cylinder.

The various parts of the fracture type coupling are sized such that the forward face of the piercing member flange portion moves into seating engagement with the free end of the hollow cylindrical portion as the latch means move into coacting relation so that the flange portion is clamped between the hollow cylindrical portion and bung plug in the post assembly configuration of the parts.

The fracture type coupling further includes first and second sealing rings on the forward and rearward faces of the piercing member flange portion for respective sealing coaction with the free end of the hollow cylindrical portion and the bung plug rim portion in the post assembly configuration of the parts. This arrangement provides a positive and effective hydraulic seal for the various parts in their post assembly configuration and precludes leakage of the system at the connection of the conduit to the reservoir or to the master cylinder.

The quick connect type coupling is operative to seal the free end of the supply conduit in the preassembly condition and is operative to provide fluid communication between the prefilled reservoir and the prefilled hydraulic actuating apparatus in response to connection of the free end of the supply conduit to the reservoir outlet fitting, or in response to connection of the free end of the supply conduit to the master cylinder inlet fitting, or in response to connection of the free ends of first and second supply conduits connected respectively to the reservoir outlet fitting and to the master cylinder inlet fitting. The quick connect coupling also allows the supply conduit to be readily disassembled from the reservoir outlet or master cylinder inlet without loss of system fluid.

The invention also provides a method of installing an hydraulic actuating assembly for a motor vehicle clutch. The method comprises the steps of installing a reservoir in the motor vehicle having an outlet port; filling the reservoir with hydraulic fluid; installing a prefilled hydraulic actuator subassembly in the motor vehicle comprising a master cylinder having an inlet port and an outlet, a slave cylinder having an inlet, a working fluid conduit extending between the outlet of the master cylinder and the inlet of the slave cylinder; and thereafter establishing fluid communication between the inlet port of the master cylinder and the outlet port of the reservoir. This method provides a ready and efficient means for providing a hydraulic actuating assembly, such as a clutch actuating assembly, in a motor vehicle in a situation where a reservoir supplying, for example, the vehicle brake system is already available.

In one aspect of the invention method, one end of a prefilled supply conduit is sealingly connected to the inlet port of the master cylinder with the other free end of the supply conduit sealed, and the sealed end of the supply conduit is thereafter connected to the reservoir outlet port.

In another aspect of the invention method, the one end of the prefilled supply conduit is connected to the outlet port on the reservoir and the sealed free end of the supply conduit is thereafter connected to the master cylinder inlet fitting.

In a third aspect of the invention method, a first prefilled supply conduit is connected at one end to the reservoir outlet fitting with its free end sealed, a second prefilled supply conduit is connected at one end to the master cylinder inlet fitting with its free end sealed, and the sealed free ends of the first and second supply conduits are thereafter connected.

According to a further feature of the method aspect of the invention, a seal is provided in the port to which the free end of the supply conduit is connected; a further seal is provided in the free end of the supply conduit; and both seals are opened in the process of connecting the free end of the supply conduit to the related port. This method provides a means of readily connecting the prefilled and preassembled subassembly to the prefilled reservoir to instantly provide an hydraulic clutch actuator assembly for the vehicle.

According to a further feature of the method aspect of the invention, each of the seals comprises a bung partition and a coupling is provided on the free end of the supply conduit of the preassembled, prefilled subassembly and includes a piercing member which operates to rupture both bung partitions in response to connection of the free end of the supply conduit to the related port. This arrangement provides a simple, efficient, and inexpensive means for establishing fluid communication between the preassembled subassembly and the prefilled reservoir in response to the coupling of the preassembled subassembly to the prefilled reservoir.

BRIEF DESCRIPTION OF THE DRAWINGS

FIG. 1 is a perspective, schematic view of an hydraulic actuator apparatus employing the invention;

FIG. 2 is an integral view of a portion of the master cylinder of the apparatus of FIG. 1;

FIG. 3 is a fragmentary view of the slave cylinder of the hydraulic actuator apparatus of FIG. 1;

FIG. 8 is a fragmentary diagrammatic view of a further modified form of the invention;

FIGS. 11 and 12 show a modified form of coupling for use in the hydraulic actuator apparatus of FIGS. 1, 7, 8 or 10;

FIGS. 13 and 14 illustrate a disconnect ring for use with the coupling of FIGS. 11 and 12; and FIG. 15 illustrates a hand tool for use with the disconnect ring of FIGS. 13 and 14.

DETAILED DESCRIPTION OF THE PREFERRED EMBODIMENT

Figures 4, 5:
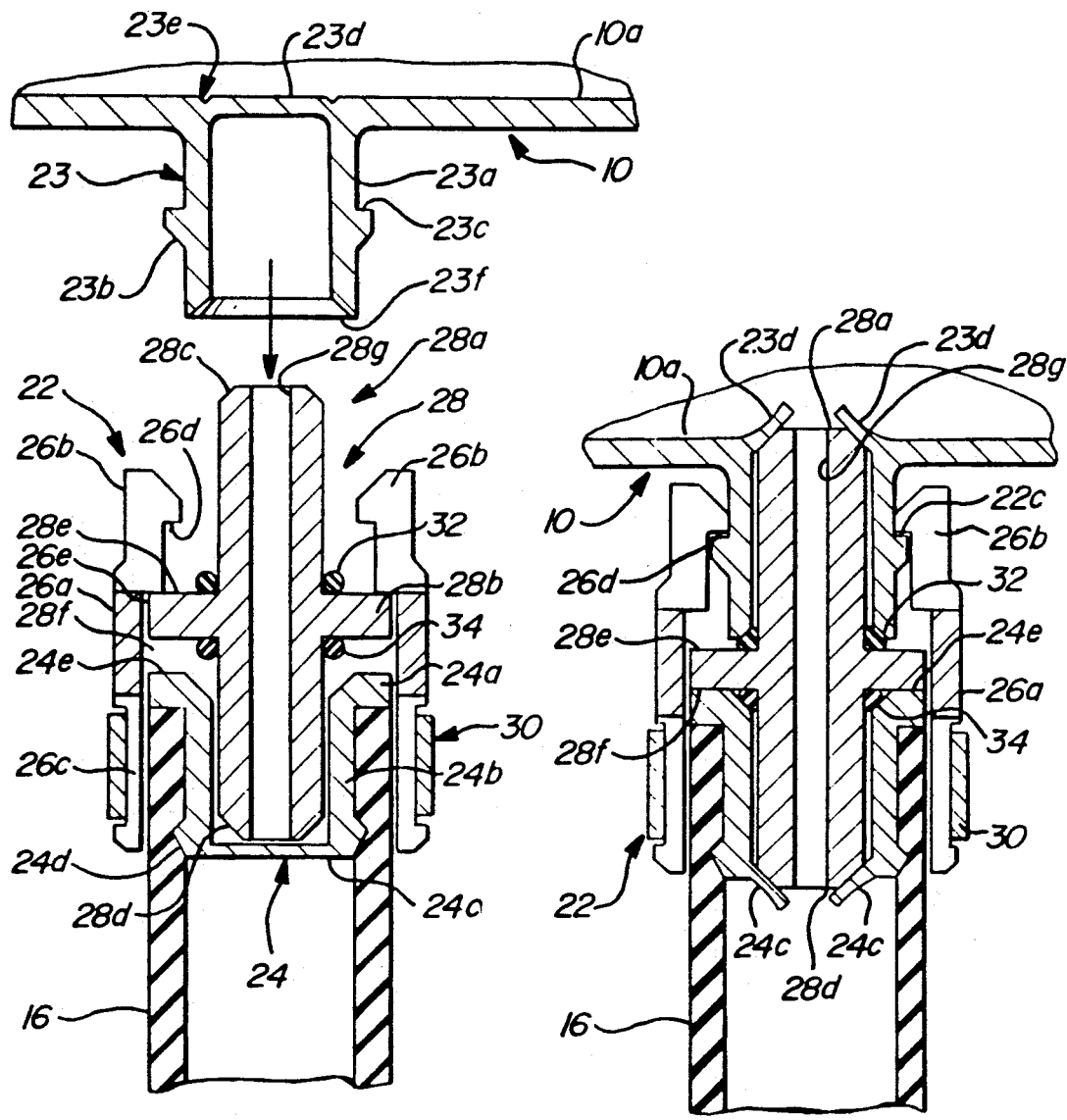
FIG. 4 is a view within the circle 4 of FIG. 1 showing a coupling for use in the hydraulic actuator apparatus of FIG. 1.
FIG. 5 is a further view of the coupling of FIG. 4 shown in coupling relation to an associated reservoir.
Figure 6:
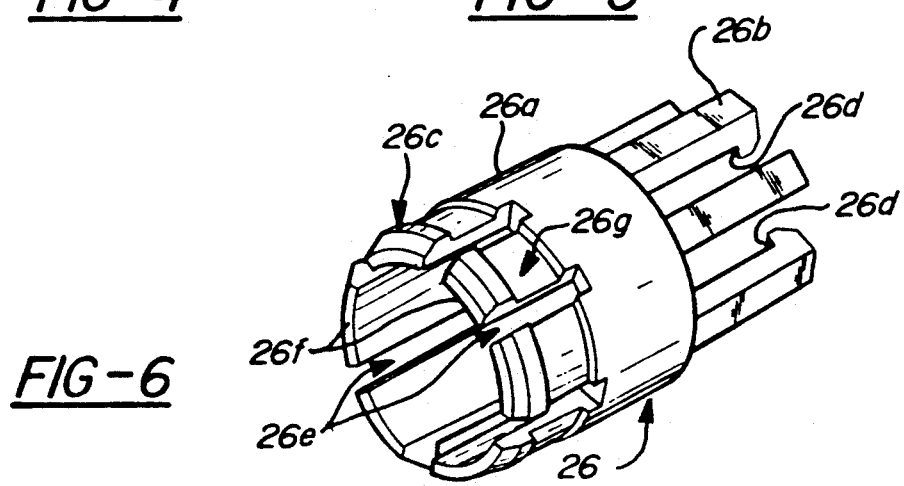
FIG. 6 is a perspective view of a lock member employed in the coupling of FIGS. 4 and 5.

The hydraulic actuator apparatus of FIG. 1 is designed for use with a reservoir 10 and includes a master cylinder 12, a slave cylinder 14, a working fluid conduit 15 interconnecting the master cylinder 12 and slave cylinder 14, and a supply conduit 16 connected to the inlet of master cylinder 12.

Master cylinder 12 is of known construction and includes a cylindrical housing 12a, a mounting flange 12b, a piston rod 12c connected to a piston 52 positioned within cylindrical housing 12a, a supply inlet 12d, and a working pressure fluid outlet 12e. It will be understood that master cylinder 12, supplied according to the invention as part of a fully operative hydraulic subassembly, is ultimately installed on a bulkhead 17 of a motor vehicle with a clutch pedal arm 18 pivotally connected at 19 to the free end of piston rod 12c, so that operator depression of clutch pedal 20 results in the discharge of hydraulic fluid under pressure from the outlet 12e of the master cylinder to deliver fluid through conduit 15 to the slave cylinder to operate the vehicular clutch mechanism.

It will be noted from FIG. 2 that the fluid supply inlet 12d enters the fluid chamber 54 of the master cylinder immediately adjacent piston 52 when the piston is in the fully withdrawn position; i.e., the position which corresponds with a fully engaged clutch. As the piston 52 moves forward, it immediately closes the inlet 12d, closing a port 56 which cuts the pressurized fluid off from the unpressurized fluid in the reservoir and the supply line 16.

The slave cylinder 14 is of known construction and includes a main body cylindrical portion 14a, a mounting flange portion 14b, a piston rod 14c connected to a piston 14d, an inlet fitting 14e, and a bleed port 14f. It will be understood that the slave cylinder 14 is supplied to the automobile assembler as part of the fully operative, preassembled, prefilled hydraulic subassembly. Ultimately, the slave cylinder is installed on a bulkhead 21 of the vehicle and the free end of piston rod 14c is connected to the release lever or throwout bearing of the clutch assembly so that inward movement of piston rod 12c of master cylinder 12 in response to actuator depression of the clutch pedal 20 results in discharge of hydraulic fluid under pressure through the outlet 12e of the master cylinder for movement through conduit 15 to slave cylinder 14 where it acts to extend piston rod 14c to disengage the clutch.

Conduit 15 is preferably formed of a plastic such as Nylon capable of withstanding high fluid pressure and extends between the outlet 12e of the master cylinder and the inlet 14e of the slave cylinder. Conduit 15 sealingly engages the outlet 12e of the hydraulic cylinder and sealingly engages the inlet 14e of the slave cylinder so as to form a continuous high pressure hydraulic link system extending from the working pressure fluid chamber 54 of the master cylinder to the slave cylinder.

Conduit 16 is preferably formed of a resilient, expansible, elastomeric material such as rubber and is sealingly secured at its lower end to inlet 12d of master cylinder 12. The upper or free end conduit 16 is provided with coupling means 22 which provides a seal for the prefilled hydraulic actuator when assembled at the factory and which coacts with an outlet fitting 23 on the reservoir 10 when finally installed in the vehicle. Coupling means 22 is seen detail in FIGS. 4 and 5.

Coupling means 22 includes a bung plug 24, a locking member 26 and a piercing member 28.

Bung plug 24 is formed of a suitable plastic material and includes a rim portion 24a, a cylinder main body portion 24b, and a bottom portion 24c forming a bung partition. Bung plug 24 is inserted into the free open end of hose 16 to seat rim portion 24a against the annular free end of the hose. Bung plug 24 is held firmly in position within the end of the hose by the frictional engagement of external teeth or serrations 24d on the bung plug with the interior circumferential surface of the hose.

Locking member 26 is formed of a suitable plastic material and includes a cylindrical main body portion 26a, a plurality of latch fingers 26b, and an attachment portion 26c. Latch fingers 26b extend forwardly from main body portion 26a in circumferentially spaced relation. Each finger extends inwardly at its forward or free end to define a latch shoulder 26d. Attachment portion 26c includes a plurality of axially extending and circumferentially spaced slots 26e which divide attachment portion 26c into a plurality of circumferentially spaced segments 26f extending rearwardly from main body portion 26a in circumferentially spaced relation. Each section 26f is configured at its exterior to define a recess 26g and the recesses 26g of the plurality of circumferentially spaced sections 26f coact to define a circumferential groove. Locking member 26 is fitted over the free end of hose 16 in surrounding relation to bung plug 24 and is secured to the free end of the hose by a suitable circular clamp or clip 30 formed of plastic or the like. Clamp 30 seats in recesses 26g of sections 26f and clampingly secures the attachment portion 26c of the locking member to the free end of the hose.

Piercing member 28 may be formed, for example, of aluminum and includes a central main body hollow cylindrical portion 28a and a flange portion 28b. Flange portion 28b is positioned midway between the forward and rearward ends of main body portion 28a and divides main body portion 28a into a forward end portion 28c and a rearward end portion 28d. Piercing member 28 is positioned concentrically within locking member 26 with the rear end portion 28d of the main body portion positioned within the hollow of bung plug 24 and front end portion 28c projecting forwardly beyond the forward extent of latch fingers 26b of locking member 26. Flange member 28b slidably engages the inner circumferential wall of main body portion 28a of locking member 26 and the forward and rearward travel of piercing member 28 relative to locking member 26 is defined respectively by shoulders 26e defined at the junction of latch fingers 26b and the main body portion 26a of locking member 26 and by the forward annular face 24e of rim portion 24a of bung plug 24. A first O-ring 32 encircles main body front end portion 28c adjacent the forward annular face 28e of piercing member flange portion 28b, and a second O-ring 34 encircles piercing member rear end portion 28d adjacent the rear annular face 28f of piercing member flange portion 28b.

Figure 7:
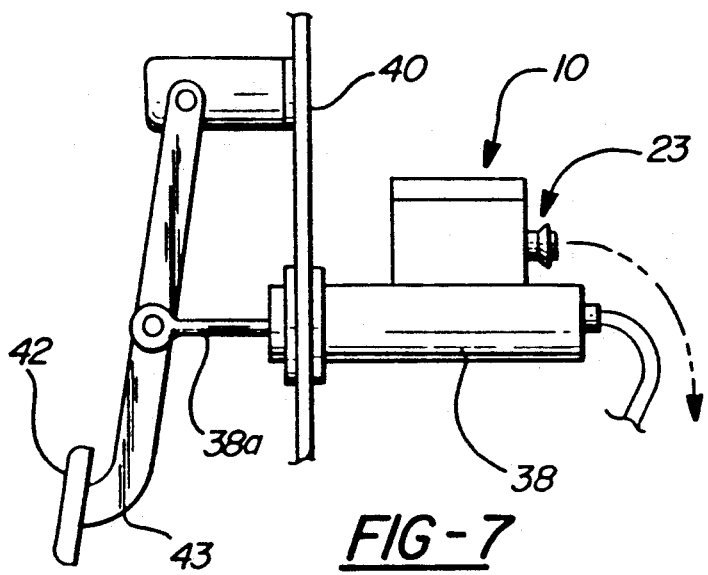
FIG. 7 is a fragmentary diagrammatic view of a modified form of the invention.

Reservoir 10, as seen in FIG. 1, may be secured to a bulkhead or frame structure 36 of the associated vehicle or, as seen in FIG. 7, may comprise a reservoir formed integrally with a brake master cylinder unit 38 suitably secured to a vehicular bulkhead 40 and actuated in known manner by a brake pedal 42 carried by a pivotal brake pedal arm 43 pivotally secured to the piston rod 38a of the brake master cylinder. In either arrangement, the reservoir defines an outlet fitting 23 for coaction with the invention coupling means 22.

In the case of a separate remote reservoir as seen in FIG. 1, the outlet fitting 23 may be provided on the lower wall of the reservoir and a further outlet fitting 44 may be provided for connection in known manner to the master cylinder 46 of the vehicular braking system by a suitable conduit. Brake master cylinder 46 is in turn connected in known manner by hydraulic conduits 48 to the wheel slave cylinders 50 and is actuated in known manner by a brake pedal 42 carried by a pivotal brake pedal arm 43 pivotally connected to the piston rod 46a of the brake master cylinder.

In the arrangement of FIG. 7 in which the reservoir is integral with the brake master cylinder, the reservoir 10 communicates at its lower end in known manner with the interior of the brake master cylinder 38, and the outlet fitting 23 may be provided on a side wall of the reservoir.

In either arrangement, outlet fitting 23 comprises a hollow cylindrical portion or section 23a formed integrally with or attached to the main body of the reservoir, an external flange 23b on cylindrical portion 23a and defining a locking shoulder 23c, and a reduced thickness bung partition 23d formed integrally with the wall 10a of the reservoir and weakened as by scoring 23e extending around the outer periphery of the bung partition.

In the use of the invention method and apparatus of FIGS. 1-7, the combination of master cylinder 12, slave cylinder 14, working pressure conduit 15 and low-pressure supply conduit 16 are assembled. Piston 52 is positioned to open the port 56 to supply conduit 16 and the entire assembly is filled with fluid and bled to eliminate trapped air. Vacuum filling is preferred but not essential. Bleed port 14f of slave cylinder 14 is sealed, and coupling 22 is installed to seal the free end of conduit 16. The prefilled, preassembled unit is tested and packaged for transportation to the automobile assembly site.

At the assembly site, a reservoir 10 is installed in the motor vehicle at a work station, either as a separate unit as seen in FIG. 1 or as part of the master cylinder of the brake system as seen in FIG. 7. Thereafter, the brake system of the vehicle is bled and filled in known manner. Thereafter, the hydraulic actuating apparatus of the invention, comprising master cylinder 12, slave cylinder 14, conduit 15, and conduit 16, is connected to the reservoir 10 at the fitting 23 to provide a clutch actuator mechanism.

Specifically, after reservoir 10 has been installed either as a separate unit or as an integral part of the brake master cylinder and the braking system has been bled and filled, master cylinder 12 is suitably secured to bulkhead 17, slave cylinder 14 is suitably secured to bulkhead 21, and coupling means 22 on the free end of conduit 16 is connected to reservoir outlet fitting 23 to pierce bung partitions 24c and 23d and establish fluid communication between the prefilled hydraulic reservoir and the prefilled hydraulic actuating assembly.

As seen in FIGS. 4 and 5, as coupling means 22 is moved into engagement with outlet fitting 23, piercing member front end portion 28c moves into engagement with bung partition 23d so that, at this point of partial connection, piercing member front end portion 28c is in abutting engagement with bung partition 23d and piercing member rear end portion 28d is in abutting engagement with bung partition 24c. As the coupling is moved to its fully latched position with respect to the outlet fitting as seen in FIG. 4, piercing member front end portion 28c bursts through bung partition 23d and piercing member rear end portion 28d bursts through bung partition 24c so as to establish fluid communication between hose 18 and the interior of the reservoir through the hollow central through-bore 28g in the piercing member. As the coupling 20 reaches its fully latched position with respect to outlet fitting 22, latch fingers 26b move flexibly over flange 23b of the outlet fitting and then snap into their latched positions as seen in FIG. 5 in which finger shoulders 26d coact with flange shoulder 23c to preclude removal of the coupling from the reservoir. In the fully latched position, flange portion 28b of the piercing member is clamped between the annular outer edge 23f of fitting 22 and the front annular surface 24e of rim portion 24a of the bung plug, O-ring 32 is sealingly compressed between outlet fitting annular surface 23f and annular surface 28e on the flange portion of the piercing member to preclude leakage of fluid from the interior of the reservoir to the exterior of the coupling, and O-ring 34 is sealingly compressed between bung plug rim portion 24a and the rear face 28f of the flange member of the piercing member to preclude leakage of hydraulic fluid from the interior of hose 16 to the exterior of the coupling.

Figure 9:
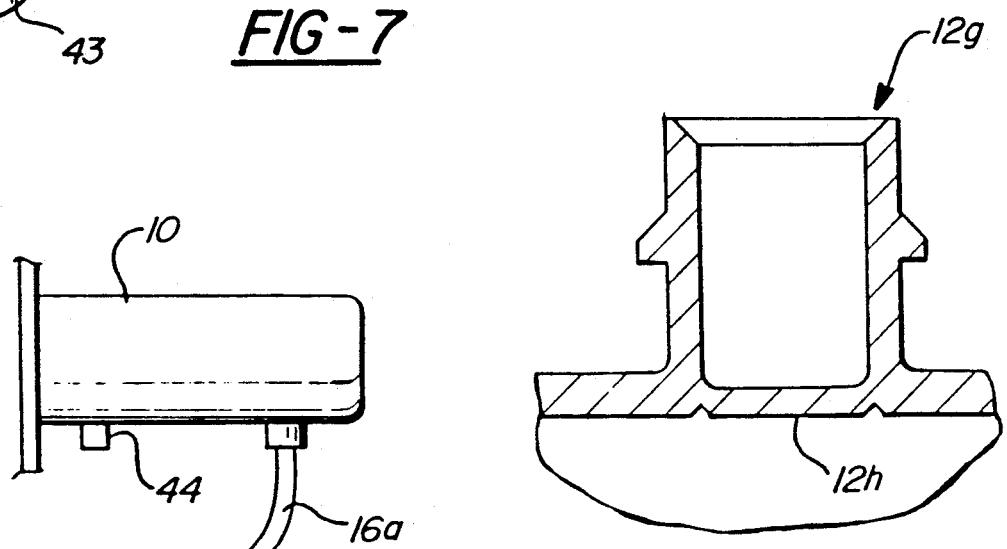
FIG. 9 is a fragmentary view taken within the circle 9 of FIG. 8.

In the modified form of the invention seen in FIGS. 8 and 9, the supply conduit 16 is fixedly connected to an outlet on reservoir 10 and the coupling means 22 is provided on the lower free end of conduit 16 for coaction with an inlet fitting 12g on master cylinder 12. Inlet fitting 12g corresponds structurally and functionally to reservoir outlet fitting 23 in the FIG. 1-6 embodiment and coacts with coupling means 22 to establish fluid communication between line 16 and the interior of master cylinder 12 in response to connection of coupling means 22 to fitting 12g. Specifically, as coupling means 22 is fitted onto fitting 12g, piercing member 28 of the couplig means operates to pierce bung partition 24c of the coupling means and to simultaneously pierce bung partition 12h of fitting 12g.

In the use of the FIG. 8 and 9 embodiment, the combination of master cylinder 12, slave cylinder 14 and working pressure conduit 15 are assembled and the assembly is bled and filled with fluid. The prefilled, preassembled unit is tested and packaged for transportation to the automobile assembly site.

At the assembly site, reservoir 10 is installed in the motor vehicle at a work station with conduit 16 attached in a dangling fashion. The reservoir 10 is connected at fitting 44 to the vehicular brake system, and the reservoir, brake system, and conduit 16 are filled with fluid with bung partition 24c of coupling 22 sealing the lower dangling end of line 16.

Thereafter, master cylinder 12 is suitably secured to bulkhead 17, slave cylinder 14 is suitably secured to bulkhead 21, and coupling means 22 on the free end of conduit 16 is connected to master cylinder inlet fitting 12g to pierce bung partitions 24c and 12h and establish fluid communication between the prefilled hydraulic reservoir assembly and the prefilled hydraulic actuating assembly.

Figure 10:
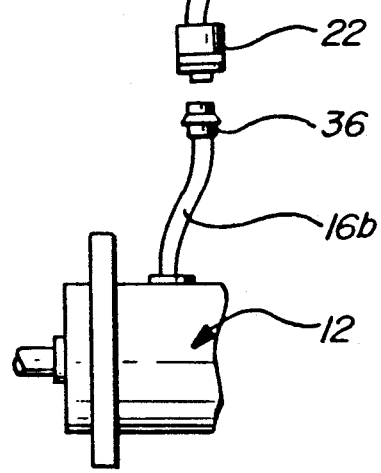
FIG. 10 is a fragmentary diagrammatic view of a still further modified form of the invention.

In the modified form of the invention seen in FIG. 10, supply conduit 16 comprises two halves or sections 16a and 16b. Half 16a is sealingly secured at its upper end to an outlet fitting on reservoir 10 and includes a coupling 22 sealing its lower end. Half 16b is sealingly secured at its lower end to the inlet fitting 12d of the master cylinder 12 and is sealed at its upper or free end by a fitting 36 corresponding in all essential details to the fitting 23 of the FIG. 1 embodiment and the fitting 12g of the FIG. 8 embodiment.

In the case of the FIG. 10 embodiment, the combination of master cylinder 12, slave cylinder 14, working pressure conduit 15, and supply conduit half 16b are assembled but without fitting 36, the assembly is bled and filled with fluid, and fitting 36 is secured to the free end of supply conduit half 16b to seal that conduit. The prefilled, preassembled unit is tested and packaged for transportation to the automobile assembly site.

As the assembly site, reservoir 10 is installed in the motor vehicle at a workstation with conduit half 16a attached in dangling fashion to the reservoir and with its lower end sealed by coupling 22. The reservoir 10 is connected at fitting 44 to the vehicular brake system, and the reservoir, brake system, and conduit half 16a are filled with fluid with bung partition 24c of coupling 22 sealing the lower dangling end of supply conduit half 16a.

Thereafter, master cylinder 12 is suitably secured to bulkhead 17, slave cylinder 14 is suitably secured to bulkhead 21, and coupling means 22 on the free end of supply conduit half 16a is connected to coupling 36 on the free end of supply conduit half 16b to pierce bung partitions 24c and the partition provided by fitting 36 and establish fluid communication between the prefilled hydraulic reservoir assembly and the prefilled hydraulic actuating assembly.

FIGS. 11 and 12 illustrate a modified form of coupling for use in the hydraulic actuator appartus of FIGS. 1, 7, 8 or 10. The coupling of FIGS. 11 and 12 is of the quick connect type and replaces the fracture or piercing type coupling 22 shown in the apparatus of FIGS. 1, 7, 8 or 10.

Specifically, the leak-proof quick connector of FIGS. 11 and 12 includes two complementary interchangeable half connectors 44 and 46, each formed of a tubular body 47 and 49 respectively. The half connector 44 is of the female type and its tubular body 47 has a bore 48 capable of slidably accepting the cylindrical peripheral surface 50 of the tubular body 49 of male member 46. FIG. 12 illustrates the female and male members 44 and 46 coupled while FIG. 11 illustrates the female member 44 and male member 46 uncoupled prior to introducing tubular body 49 of the male member 46 into the bore 48 of the female member 44, following installation of the prefilled hydraulic reservoir assembly and the prefilled hydraulic actuating assembly in their respective locations in the motor vehicle.

The tubular body 47 of the female member 44 is formed, for example and preferably, of a single piece casting or forging of aluminum. Body 47 is provided at one end with an integral tapered portion defining an end cap 51 terminating in an integral outwardly projecting fitting 53. A passageway 55 provides fluid communication with the interior of a conduit (such as the supply conduit 16a of FIG. 10) having its end fitted over the fitting 53 and being suitably secured thereon. The bore 48 of tubular body 47 has an enlarged diameter portion 58 at the end of the bore adjacent end cap 51. An elastic plastic retainer ring 60 is fitted within end portion 58 and ring 60 holds a metallic disk 62 against a shoulder 64 at the end of bore 48. The disk 62 is perforated by a plurality of apertures 66 providing fluid communication between the passageway 56 and therefore the conduit 16a, and the interior bore 48 of the tubular body 47. A rod or stem 78 is fixedly mounted at the center of the disk 62 and extends longitudinally and axially in the bore 48. The rod 68 has an enlarged head 70 at its end provided with groove 72 in which is disposed an annular seal 74 made of elastomeric material.

A sleeve 76 is slidably disposed in the bore 48. Sleeve 76 has a peripheral groove 78 in which is disposed an elastomeric sealing ring 80. A coil spring 82 disposed between the retainer ring 60 and an annular abutment surface 84 of the sleeve 76 urges the sleeve 76 outwardly against or in close proximity with an elastomeric O-ring 86 disposed in an internal groove 88 close to the open end of the tubular body 47. The sleeve 76 has an end port in the form of a bore 89 that slidably fits about the enlarged head 70 at the end of the rod 68, the bore 89 having a reduced diameter portion forming an annular abutment 90 which, in the uncoupled position of FIG. 11, limits the outward displacement of the sleeve 76 and engages the elastomeric annular seal 74 in the groove 72 of the enlarged head 70 of the rod 68, such that with hydraulic fluid in the bore 48 of the tubular member 47, behind the sleeve 76, the fluid is contained in the bore 48 without leakage to the ambient.

The open end of the female member tubular body 47, beyond the O-ring 86, is provided with an enlarged diameter portion 92 in which is disposed a retainer clip 94 between the annular shoulder abutments or walls 96 and 98 formed by the enlarged diameter portion 92 of the bore 48, the annular shoulder abutment 98 being defined by the inner surface of an inwardly directed flange 100 ending in a cylindrical surface 102. A frustoconical surface 103 is disposed between the groove 88 in which is disposed the O-ring 86 and the shoulder abutment or wall 96 of the bore enlarged diameter portion 92.

The retainer clip 94 is made of a relatively thin-walled spring steel tubular member or ring 1094 slit such that it can be compressed for fitting within the enlarged bore portion 92 at the end of the female member tubular body 47 between the shoulder abutments 96 and 98 and allowed to expand elastically to its original diameter. The spring steel ring 104 has a plurality of inwardly inclined fingers 106 converging towards the interior of the female member bore 48, formed by portions partially cut-out from the body of the ring 104, each finger 106 presenting an end face 107 disposed radially a distance away from the internal surface of the body portion of the spring steel ring 104.

The male half or member 46 of the connector 32 has a tubular body 49 having a peripheral surface 50 of a diameter permitting slidable fit in the bore 48 of the connector female member 44. The periphery 50 of the male member tubular body 49 is provided with an outwardly extending annular ridge or bead 108 of an outer diameter allowing passage of the tip of the ridge 108 within the cylindrical surface 102 of the flange 100 at the tip of the tubular body 47 of the female member 44. The forward side of the ridge 108 forms a ramp 112 which, when the male member 46 is introduced into the female member 22, coacts with the nose or tip of the male member to cause progressive elastic deflection of the retainer clip fingers 106 until the fingers 106 elastically snap back substantially to their original position with the end face 107 of each finger 106 engaging a radial annular shoulder 114 formed on the other side of the annular ridge 108. Further introducing of the male member 46 into the female member 44 is prevented by the ramp 112 engaging the frusto-conical surface 103 in the female member 44.

The male member tubular body 46 is closed at one extreme end by an end cap 116 screwed on, welded, soldered, or brazed in position over that end of the tubular body 49. The end cap 116 is provided with a fitting 118 for connection to an appropriate conduit (such as supply conduit half 16b of the FIG. 10 embodiment). Fitting 118 defines a passageway 120 placing the interior of conduit 16b in fluid communication with the bore 122 within the female member tubular body 48. A cylindrical, generally cup-shaped valve member 124 is slidably disposed within the bore 122 and is urged by a coil spring 126, having an end abutting the end cap 116 and the other end engaged against an annular abutment 128 within the valve member 124, to the position shown in FIG. 11 when the connector female and male members 44 and 46 are uncoupled. The valve member 124 has a solid cylindrical end portion 130 of a diameter adapted to fit within a retaining end flange 132 formed at the open end of the tubular body 49. An annular elastomeric ring 134 is disposed around the solid cylindrical end portion 130 of the valve member 134 and prevents leakage of fluid from the bore 122 in the male member tubular body 49 to the ambient, when the connector members are uncoupled, in view of the action of the coil spring 126 firmly engaging the elastomeric seal 134 against the inner surface of the end retaining flange 132. The valve member 124 is provided on its periphery with longitudinal grooves 136 which provide fluid communication between the bore 122 of the male member 46 and the bore 48 of the female member 44 when the valve member 124 is displaced, against the biasing action of the coil spring 126, to the position shown in FIG. 12, by the end of the enlarged head portion 70 at the end of the rod 68 in the female member 44, during the coupling of connector female member 44 and male member 46. Simultaneously during coupling, the end of the male member tubular body 49, that is provided with the flange 132, retracts the sleeve 76 in the female member bore 48 against the biasing action of the coil spring 82 such that the sleeve annular abutment 90 no longer engages the annular seal 74 at the enlarged head 70 of the rod 68 and the bore or port 89 is open to hydraulic fluid flow. When coupled together, as shown in FIG. 12, the female member 44 and the male member 46 of the connector 32 thus provide an uninterrupted free passage for the flow of hydraulic fluid between the bore 48 of the female member 44 and the bore 122 of the male member 46, which is leakproof to the ambient as a result of the periphery 50 of the tubular body 48 of the male member 46 being engaged with and compressing the O-ring 86 in the internal groove 88 of the female member 44. After connector members are securely coupled, FIG. 12, the end face 107 of each flexible finger 106 of the retainer clip 94 engages the annular abutment 114 of the ridge 108 about the periphery of the male member tubular body 49 and separation of the two connector members is prevented.

The structure of FIGS. 11,12 provides a one-way coupling of the connector female member 44 with the male member 46 such as to prevent deliberate breaking off of the hydraulic apparatus once installed in a motor vehicle. If it is desired to disconnect the female member 44 and the male member 46 of the connector 32, a disconnect ring 138, shown in FIGS. 13 and 14, is all that is required. Disconnect ring 138 is a simple metallic or plastic tubular member 140 provided with a slit 142 allowing the tubular member 140 to elastically expand so as to be passed over the periphery of the male member and cap 116, or over the peripherally extending annular ridge 108, in structures where it is desired to provide the male member 46 with a built-in disconnect ring 138 as seen in FIG. 13. The disconnect ring 138 is thin enough to enable it to be pushed within the cylindrical surface 102 formed by the flange 100 at the end of the female member tubular body 42. By displacing the disconnect ring 138 to the left, as seen at FIG. 13, the forward edge of ring tubular member 140 causes the fingers 106 of the retainer clip 94 to elastically deflect outwardly, such as to become substantially flush with the remaining of the tubular body 104 of the retainer clip, with the result that the end face 107 of each finger 106 disengages from the abutment shoulder 114 of the male member annular ridge 108. The two connector members 44 and 46 may then be disconnected, with little, if any, loss of hydraulic fluid as both connector members become automatically substantially leakproof, when disconnected, as shown in FIG. 11.

As the disconnect ring 138 offers very little surface at its free end that can be manually grasped for pushing the ring inwardly into the end of the female member tubular body 47, with sufficient force to deflect the fingers 106 of the retainer clip 94, a hand tool 144, as shown in FIG. 15, is provided. The hand tool 144 is in the form of a handle 146 having a bifurcated end 148 which is passed over the tubular body 49 of the male member 46 and is used for pushing the disconnect ring 138 within the mouth of the female member tubular body 47, FIG. 13. Connector structures, such as illustrated in FIGS. 11 and 12, which are not provided with a built-in disconnect ring 138, may nevertheless be disconnected by means of a separate disconnect ring 138 and a hand tool such as the hand tool 144. In order to place the disconnect ring 138 around the periphery of the male member tubular body 49, the ring tubular body 140 is manually expanded and the slit 142 widened such as to pass the disconnect ring 138 over the conduit and over the periphery of the end cap 116. The disconnect ring 138 is thus placed in the position illustrated at FIG. 12 allowing it to be pushed by means of the hand tool 144 for disconnecting the connector members 44 and 46.

It will be understood that although the quick connect coupling of FIGS. 11 and 12 has been illustrated in connection with the FIG. 10 embodiment of the apparatus, the quick connect coupling of FIGS. 11 and 12 may also be used with the embodiments of FIGS. 1 and 8.

Specifically, when used in connection with the embodiment of FIG. 1, the quick connect coupling half 44 would replace the coupling 22 and the quick connect coupling half 46 would replace the fitting 23, and when used in connection with the embodiment of FIG. 8, the quick connect coupling half 44 would replace the coupling 22 and the quick connect coupling half 46 would replace the fitting 12g.

In each case where the quick connect coupling 44, 46 is used in place of the fracture type coupling 23, it will be apparent that the apparatus may be readily disassembled for repair or replacement purposes without loss of fluid by simply disconnecting the coupling halves 44,46 by the use of the disconnect ring 138 and hand tool 144.

It will be seen that the invention provides a method and apparatus for quickly and efficiently providing an hydraulic actuating system in a motor vehicle of the type in which a reservoir for hydraulic fluid is already available, either as a separate common reservoir to supply two or more hydraulic onboard systems or as a captive reservoir formed integrally with the master cylinder of the existing brake system. In either situation, the complete hydraulic clutch actuator assembly is quickly and efficiently provided in the assembly process of the motor vehicle simply by attaching a suitable coupling to an outlet fitting of the prefilled common reservoir, or by attaching a suitable coupling to an inlet fitting of the prefilled hydraulic actuator assembly, or by coupling together the free ends of conduit halves connected respectively to the reservoir outlet fitting and the actuator assembly inlet fitting.

Whereas preferred embodiments of the invention have been illustrated and described in detail, it will be apparent that various changes may be made in the disclosed embodiments without departing from the scope or spirit of the invention.

I claim:

1. A preassembled hydraulic clutch actuator apparatus comprising:

a master cylinder having a supply inlet and an outlet;
a slave cylinder having an inlet;
a first high pressure conduit sealingly interconnecting the outlet of said master cylinder and the inlet of said slave cylinder;
a second low pressure conduit sealingly connected to the supply inlet of said master cylinder and adapted to be sealingly connected at its free end to an outlet fitting on a reservoir;
hydraulic fluid filling said slave cylinder, said first conduit, said master cylinder and said second conduit;
coupling means on the free end of said second conduit having a preassembly condition in which it is operative to provide a seal at said free end to thereby seal said hydraulic fluid in said second conduit, said master cylinder, said first conduit and said slave cylinder and operative in response to connection of said free end to the reservoir outlet fitting to open said seal so as to allow fluid communication between said second conduit and the reservoir;
said coupling means being further operative to open a seal on the reservoir outlet fitting in response to connection of said second conduit free end to the reservoir outlet fitting; and
said coupling means including a bung plug in the free end of said second conduit defining a bung partition sealing the free end of said second conduit, a locking member secured at its rearward end to said free end of said second conduit in surrounding relation to said bung plug and including latch means at its free forward end for latching coaction with latch means on the reservoir outlet fitting, and a piercing member disposed concentrically within said locking member forwardly of said bung partition and movable rearwardly relative to said locking member in response to connection of said locking member to the reservoir outlet fitting to pierce said bung partition.

2. A preassembled hydraulic actuator apparatus according to claim 1 wherein:

said bung plug is cup-shaped and includes an annular rim portion seating on the free annular end of said second conduit, a cylindrical main body portion extending rearwardly from said rim portion and positioned concentrically within said free end of said second conduit, and a bottom portion closing the rear end of said main body portion and defining said bung partition; and
said piercing member includes:

1) a central hollow main body piercing portion positioned in preassembled condition concentrically within said cylinder main body portion of said bung plug with its rear end positioned forwardly of said bung partition and movable rearwardly in response to connection of said locking member to the reservoir outlet fitting to pierce said bung partition, and 2) an annular external flange portion slidably disposed within said locking member and movable into seating engagement at its rear face with said rim portion of said bung plug in response to connection of said locking member to the reservoir outlet fitting to define the post assembly position of said piercing member.

3. A preassembled hydraulic actuator apparatus according to claim 2 wherein:

the reservoir is part of said apparatus;

said outlet fitting comprises a hollow cylindrical reservoir portion which projects outwardly from the main body of the reservoir and is sized to fit telescopically within the forward end of said locking member;

a bung partition is provided on said reservoir proximate to and coaxial with said hollow cylindrical reservoir portion;

the latch means on said reservoir outlet fitting comprises latch means on the external surface of said hollow cylindrical portion;

said main body piercing portion of said piercing member extends forwardly and rearwardly from said piercing member flange portion; and the forward end of said piercing member main body portion moves into said hollow cylindrical reservoir portion and pierces said reservoir bung partition in response to connecting movement of said forward end of said locking member telescopically over said hollow cylindrical reservoir portion and locking engagement of said locking member latch means with said latch means on the external surface of said hollow cylindrical reservoir portion.

4. A preassembled hydraulic actuating apparatus according to claim 3 wherein:

the various parts are sized such that the forward face of said piercing member flange portion moves into seating engagement with the free annular end of said hollow cylindrical reservoir portion as said latch means move into coacting relation so that said flange portion is clamped between the free annular end of said hollow cylindrical reservoir portion and said rim portion of said bung plug in the post assembly configuration.

5. A preassembled hydraulic actuator apparatus according to claim 4 wherein:

said coupling means further includes first and second sealing rings on the forward and rearward faces of said piercing member flange portion for respective sealing coaction with said free annular end of said hollow cylindrical reservoir portion and said bung plug rim portion in the post assembly configuration.

* * * * *